United States Patent
Thompson

(10) Patent No.: US 6,278,729 B1
(45) Date of Patent: Aug. 21, 2001

(54) METHOD AND APPARATUS FOR TESTING A COMMUNICATIONS LINE IN A DATA PROCESSING SYSTEM

(75) Inventor: Joseph Raymond Thompson, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/797,901

(22) Filed: Feb. 10, 1997

(51) Int. Cl.[7] .............................. H04B 17/00; H04L 1/38
(52) U.S. Cl. ............................ 375/224; 375/222
(58) Field of Search ................... 375/224, 222; 370/248; 379/1, 27, 28, 20.1, 31, 377, 93.28, 93.01

(56) References Cited

U.S. PATENT DOCUMENTS

| | | | |
|---|---|---|---|
| 4,112,264 | * 9/1978 | Abramson et al. | 371/20.1 |
| 4,493,951 | 1/1985 | Sanderson et al. | |
| 4,827,498 | 5/1989 | Ross . | |
| 4,924,489 | * 5/1990 | Lawrence et al. | 379/6 |
| 4,937,850 | * 6/1990 | Borbas et al. | 379/6 |
| 4,943,993 | * 7/1990 | Fore | 379/3 |
| 4,953,165 | 8/1990 | Jackson . | |
| 5,073,919 | * 12/1991 | Hagensick | 379/29 |
| 5,140,631 | * 8/1992 | Stahl | 379/377 |
| 5,436,554 | 7/1995 | Decker, Jr. . | |
| 5,528,661 | * 6/1996 | Siu et al. | 379/27 |
| 5,559,427 | 9/1996 | Hinds et al. . | |
| 5,615,225 | * 3/1997 | Foster et al. | 379/29 |

OTHER PUBLICATIONS

"Automatic Self–Test Handled by a Data Terminal . . . ", IBM Technical Disclosure Bulletin, vol. 32, No. 3A, Aug. 1989.

* cited by examiner

Primary Examiner—Tesfaldet Bocure
(74) Attorney, Agent, or Firm—Jeffrey S. LaBaw; Felsman, Bradley, Vaden. Gunter & Dillon, LLP

(57) ABSTRACT

A method and apparatus for testing a modem line in a data processing system, wherein the data processing system includes a modem having an input for a modem line. The input is tested to determine an electrical connection network is present.

15 Claims, 9 Drawing Sheets

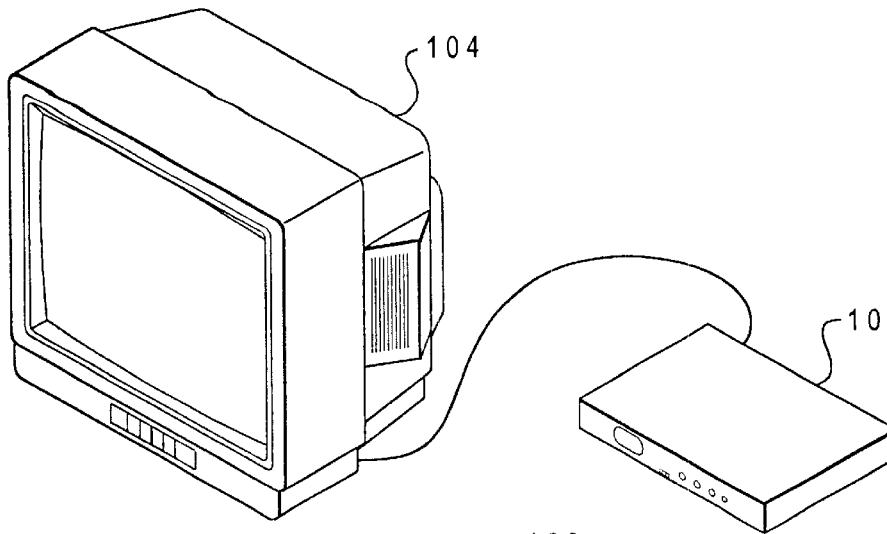
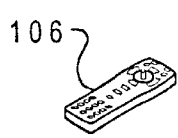
Fig. 1A
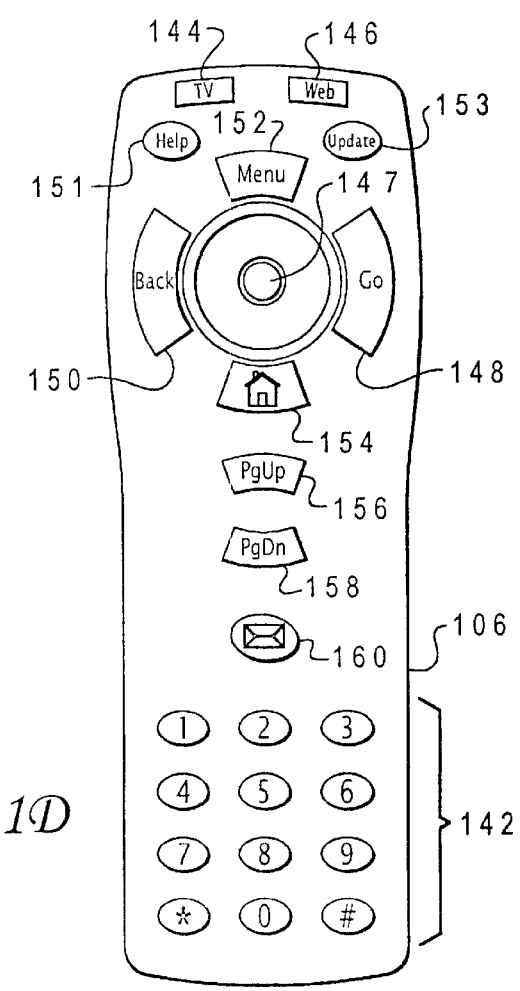
Fig. 1D

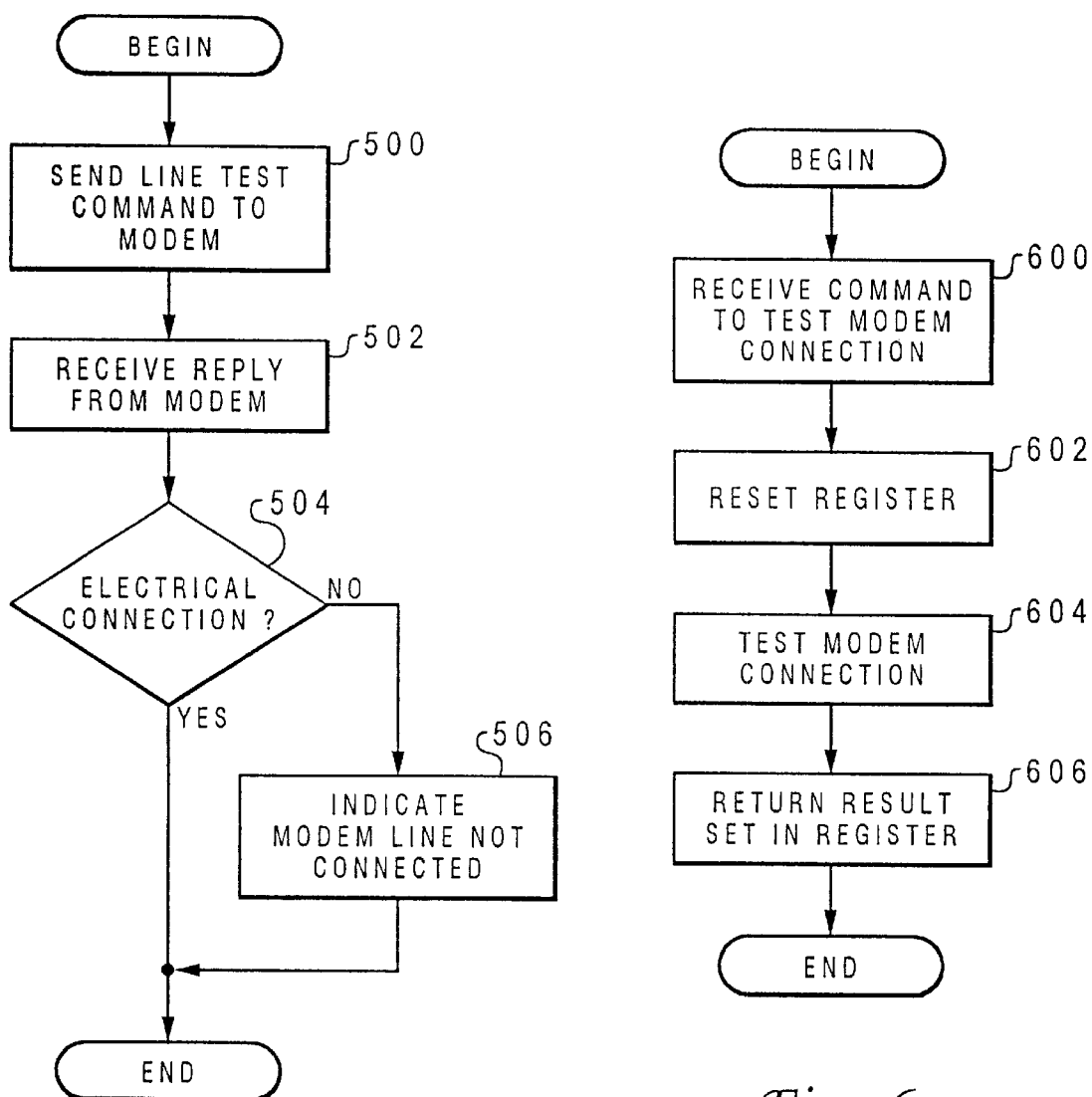

METHOD AND APPARATUS FOR TESTING A COMMUNICATIONS LINE IN A DATA PROCESSING SYSTEM

BACKGROUND OF THE INVENTION

1. Technical Field

The present invention relates generally to an improved data processing system and, in particular, to a method and apparatus for testing a communications link in a data processing system. Still more particularly, the present invention relates to a method and apparatus for testing a modem line connected to a data processing system.

2. Description of the Related Art

References to the internet and the "information superhighway" are becoming more pervasive on television and in newspapers. Advertisers are publishing http://www . . . addresses for all nature of commerce. The terms E-mail, electronic banking, and shopping from home are becoming familiar ideas to the average consumer.

As a result, a number of companies are developing systems for accessing the internet along with the World Wide Web. In particular, the network computer (NC), also called a web PC, java terminal, internet access device, browser box, etc., are computers that discard overweight operating systems and bloated platform specific applications. Typically, the systems will run microkernal operating systems and platform independent software. The systems are directed towards corporations as low cost work stations and to consumers as a lower cost, simple to use system in contrast to a typical personal computer for access to the internet. With respect to NCs being developed for consumers, these products are being offered as an appliance that provides a convergence between a television, videocassette recorder, telephone, answering machine, and a computer in a simple-to-use form. In many cases, all of these functions may be found within a single box.

The connectivity that people seek with respect to the internet and the "information superhighway" is provided by a modem, which allows the consumer's NC to establish a communications link with other data processing systems and exchange files, programs, images, and information across the telephone lines. Modems are a necessary bridge between the digital signals used in a computer and the analog signals used in a typical public switched telephone system. A function of the modem is to connect binary data signals from the NC into analog signals suitable for transmission over the PSTN. Additionally, the modem converts analog signals back into digital signals received from the PSTN from a remote data processing system.

Presently available modems allow an NC to determine whether a dial tone is present. Such an indication may be useful in the event that the modem is not connected to the telephone system. This indication of whether a dial tone is present, however, does not always accurately indicate whether the modem is connected to the telephone system. One example is the situation in which the NC has its modem connected to the same telephone line as another telephone. If the NC attempts to establish a communications link with another data processing system and another person is using that other telephone, an indication would be returned that no dial tone was present. This situation is distinguished from the situation in which the modem actually is not connected to the telephone line.

The typical consumer using an NC may be discouraged about such a situation and unable to discover why a dial tone is not present. As a result, the consumer is apt to return the appliance believing that the NC is defective. Therefore, it would be advantageous to have an improved method and apparatus for determining whether a modem is connected to a telephone line.

SUMMARY OF THE INVENTION

It is one objective of the present invention to provide an improved data processing system.

It is another objective of the present invention to provide an improved method and apparatus for testing a communications link in a data processing system.

It is yet another objective of the present invention to provide a method and apparatus for testing a modem line connected to a data processing system.

The foregoing objectives are achieved as follows:

The present invention provides a method and apparatus for testing a modem line in a data processing system, wherein the data processing system includes a modem having an input for a modem line. The input is tested to determine an electrical connection network is present.

The above as well as additional objects, features, and advantages of the present invention will become apparent in the following written description.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description and illustrative embodiment when read in conjunction with the accompanying drawings wherein:

FIGS. 1A–1D depict various pictorial representations of a data processing system in which the present invention may be implemented;

FIG. 5 is flowchart of a process for testing a modem line initiated by the data processing system according to the present invention;

FIG. 6 is a flowchart of a process for testing a modem for an electrical connection according to the present invention.

DETAILED DESCRIPTION OF THE PREFERRED EMBODIMENT

Figure 1B:
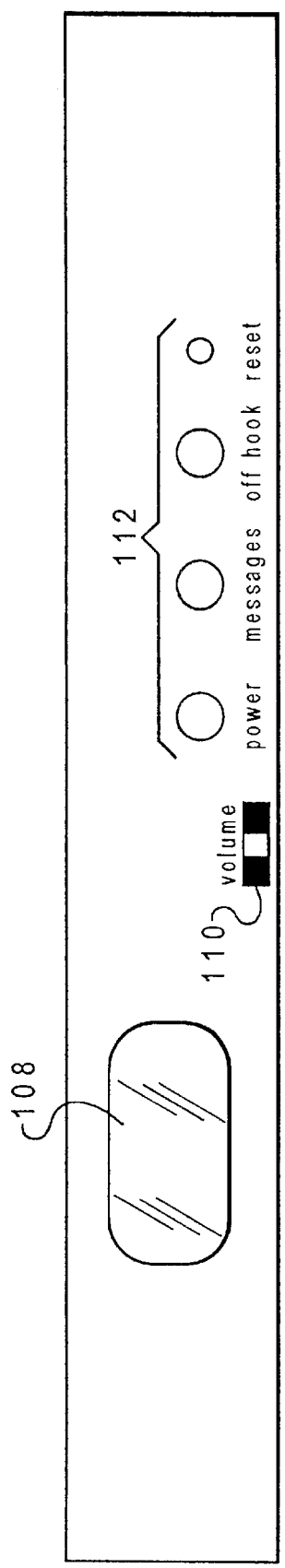

With reference now to the figures, and in particular with reference to FIGS. 1A through 1D, various pictorial representations of a data processing system in which a preferred embodiment of the present invention may be implemented are depicted. FIG. 1A is a pictorial representation of the data processing system as a whole. Data processing system 100 in the depicted example provides, with minimal economic costs for hardware to the user, access to the Internet. Data processing system 100 includes a data processing unit 102. Data processing unit 102 is preferably sized to fit in typical entertainment centers and provides all required functionality, conventionally found in personal computers, to enable a user to "browse" the Internet. Additionally, data processing unit 102 may provide other common functions such as, for example, serving as an answering machine, transmitting or receiving facsimile transmissions, or providing voice mail facilities.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device in conventional personal computers, including the ability to move a cursor on a display and select items.

FIG. 1B is a pictorial representation of the front panel of data processing unit 102 in accordance with a preferred embodiment of the present invention. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

Figure 1C:
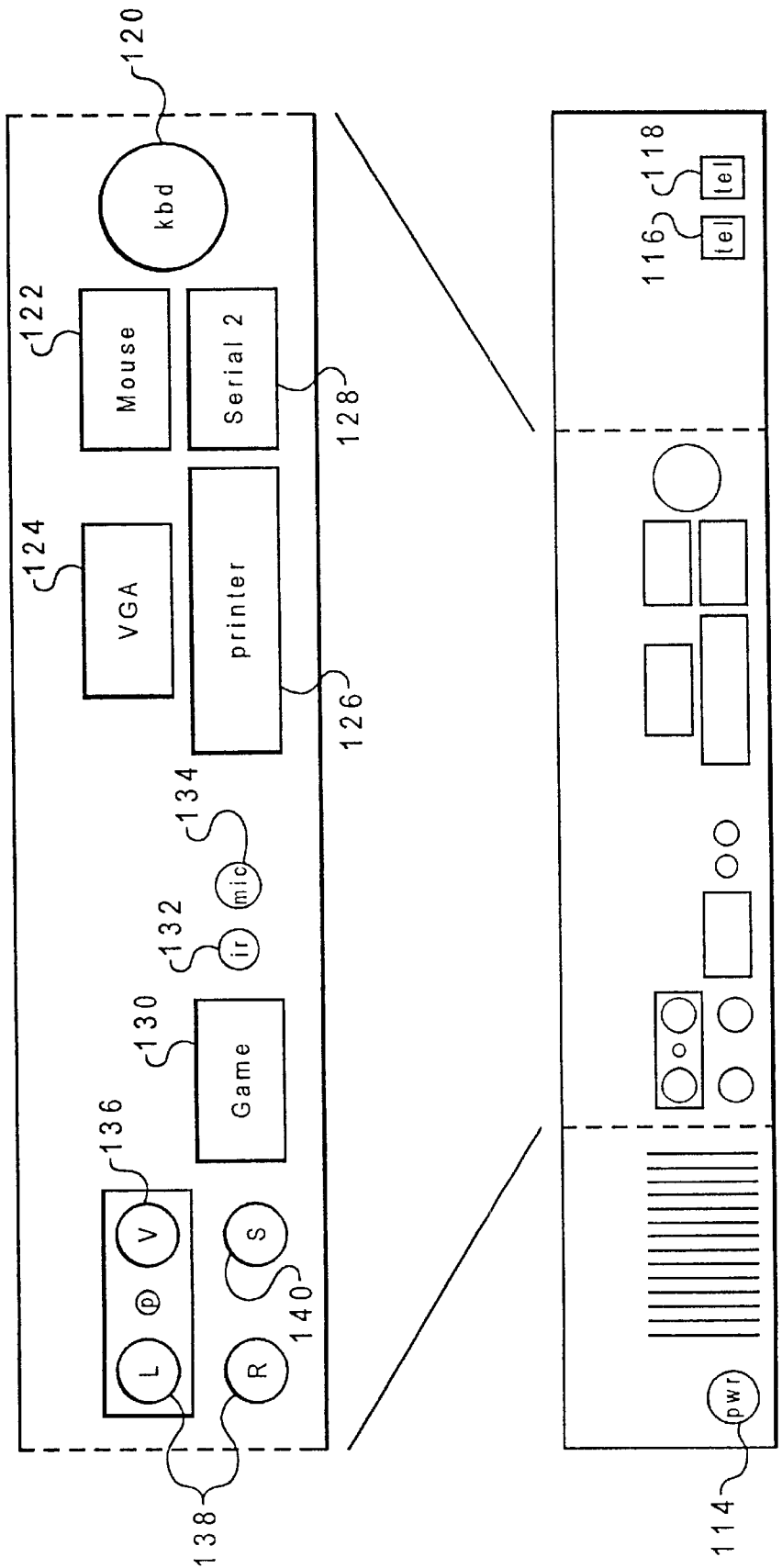

FIG. 1C is a pictorial representation of the rear panel of data processing unit 102 in accordance with a preferred embodiment off the present invention. A three wire (ground included) insulated power cord 114 passes through the rear panel. Standard telephone jacks 116 and 118 on the rear panel provide an input to a modem from the phone line and an output to a handset (not shown). The rear panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel 3/4 modulator (not shown) may be connected in-line with the antenna connection.

FIG. 1D is a pictorial representation of remote control unit 106 in accordance with a preferred embodiment of the present invention. Similar to a standard telephone keypad, remote control unit 106 includes buttons 142 for arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet. A pointing device, which is preferably a trackpoint or "button" pointing device, is included on remote control unit 106 and allows a user to manipulate a cursor on the display of television 104. "Go" and "Back" buttons 148 and 150, respectively, allow a user to select an option or return to a previous selection. "Menu" button 152 causes a context-sensitive menu of options to be displayed, while home button 154 allows to user to return to a default display of options. "PgUp" and "PgDn" buttons 156 and 158 allows the user to change the content of the display in display-sized blocks rather than by scrolling. The message button 160 allows the user to retrieve messages. In addition to, or in lieu of, remote control unit 106, an infrared keyboard (not shown) with an integral pointing device may be used to control data processing unit 102. The integral pointing device is preferably a trackpoint or button type of pointing device. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device locks out all others until a prescribed period of inactivity has passed.

Figure 2:
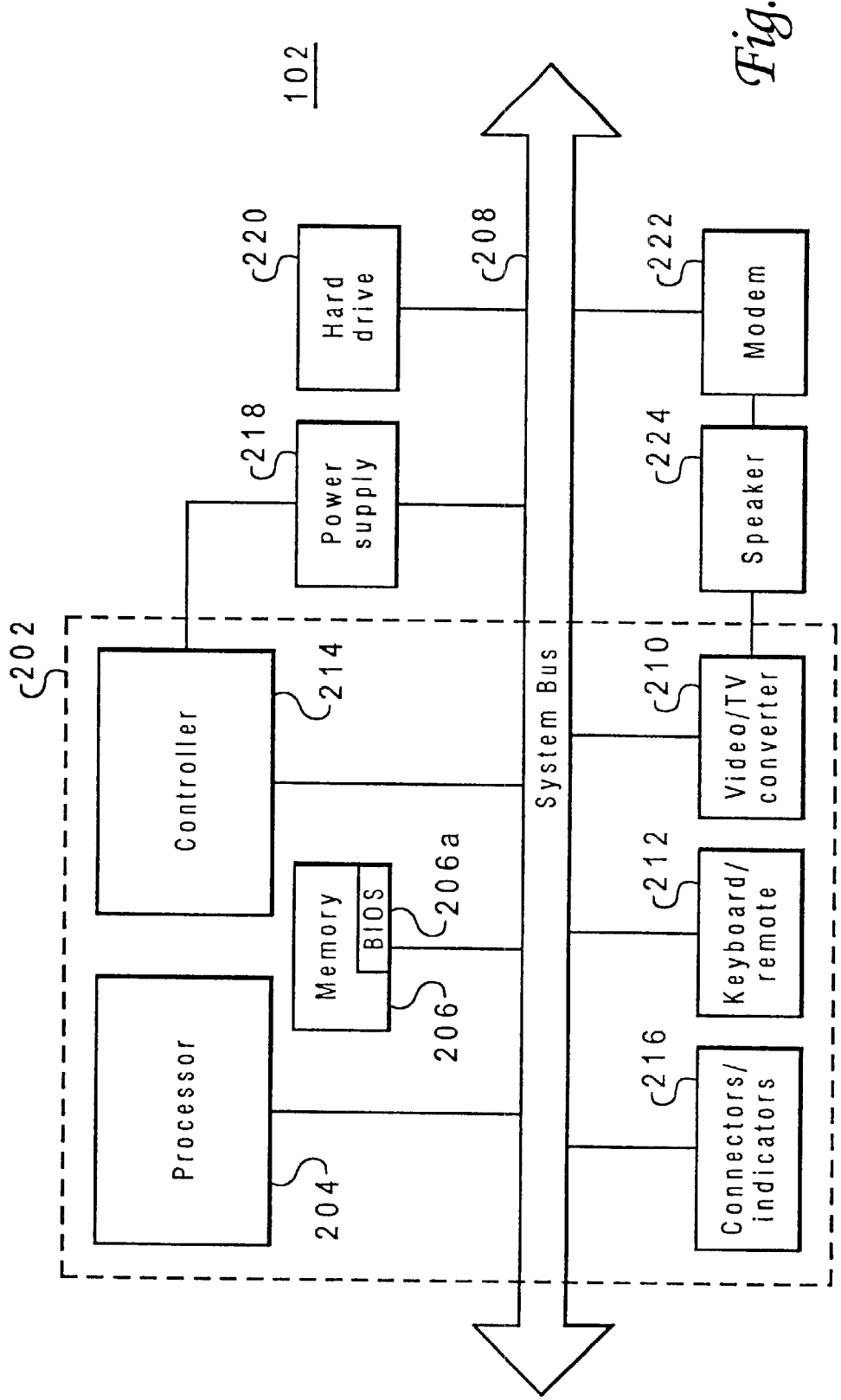
FIG. 2 is a block diagram of components within the data processing system illustrated in FIGS. 1A–1D according to the present invention.

Referring now to FIG. 2, a block diagram for the major components of data processing unit 102 in accordance with a preferred embodiment of the present invention is portrayed. As with conventional personal computers, data processing unit 102 includes a motherboard 202 containing a processor 204 and memory 206 connected to system bus 208. Processor 205 is preferably at least a 486 processor operating at or above 100 MHz. Memory 206 includes read only memory (ROM) 206a containing a basic input/output services (BIOS) routine and may include cache memory and/or video RAM.

Video/TV converter 210 on motherboard 202 and connected to system bus 208 generates computer video signals for computer monitors, a composite television signal, and an S-Video signal. The functionality of video/TV converter 210 may be provided utilizing commercially available video and converter chips. Keyboard/remote control interface unit 212 on motherboard 202 receives keyboard codes through controller 214, regardless of whether a wired keyboard/pointing device or an infrared keyboard/re(mote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the functions provided by an infrared keyboard. Connectors/indicators 216 on motherboard 202 provide the connections and indicators on data processing unit 102 described above.

External to motherboard 202 in the depicted example are power supply 218, hard drive 220, modem 222, and speaker 224. Power supply 218 is a conventional power supply except that it receives a control signal from controller 214 which effects shut down of all power to motherboard 202, hard drive 220, and modem 222. In some recovery situations, removing power and rebooting is the only guaranteed method of resetting all of these devices to a known state. Thus power supply 218, in response to a signal from controller 214, is capable of powering down and restarting data processing unit 102.

Hard drive 220 contains operating system and applications software for data processing unit 102, which preferably includes: IBM DOS 7.0, a product of International Business Machines Corporation in Armonk, N.Y.; Windows 3.1, a product Microsoft Corporation in Redmond, Wash.; and Netscape Navigator, a product of Netscape Communications Corporation in Mountain View, Calif. Data may also be stored on hard drive 220. Modem 222, inserted into a slot mounted sideways on motherboard 202, is preferably a 33.6 kbps modem supporting the V.42bis, V34bis, V.34, V.17 Fax, MNP 1–5, and AT command sets.

Controller 214 is preferably one or more of the 805x family controllers. Controller 214 is continuously powered and, when data processing unit 102 is turned on, monitors the system for a periodic "ping" indicating that data processing unit 102 is operating normally. In the event that controller 214 does not receive a ping within a prescribed timeout period, controller 214 removes power from the system and restarts the system. This may be necessary, for example, when the system experiences a general protection fault. If multiple attempts to restart the system prove unsuccessful, controller 214 shuts off data processing unit 102 and signals that service is required through indicators 216. Thus, data processing unit 102 is capable of self-recovery in some circumstances without involvement by a user.

Controller 214 also receives and processes input from infrared remote control 106, infrared keyboard; wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use and specifies the boot sector selection during any power off-on cycle.

Those skilled in the art will recognize that the components depicted in FIGS. 1A–1D and 2 and described above may be varied for specific applications or embodiments. Such variations in which the present invention may be implemented are considered to be within the spirit and scope of the present invention.

Figure 3:
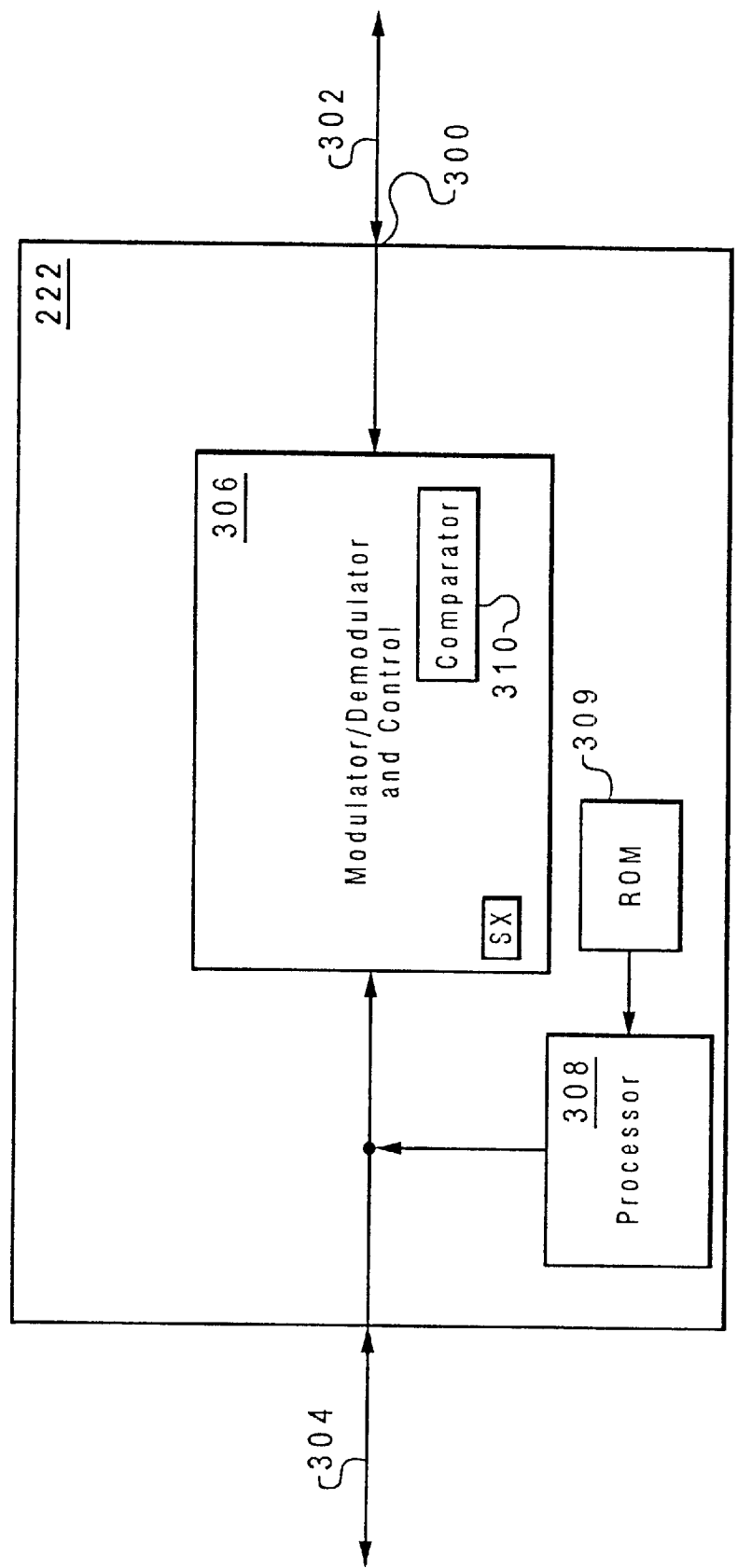
FIG. 3 is block diagram of a modem from the data processing system depicted in FIGS. 1A–1D and 2 according to the present invention.

With reference now to FIG. 3, a block diagram of a modem 222 from FIG. 2 is depicted according to the present invention. Modem 222 includes a modem input 300 connected to a line 302, also called a modem line, connected to an external phone line through a connection to a wall plug. Modem 222 also includes a line 304, which is connected to system bus 208 as illustrated in FIG. 2. Modem 222 includes a modulator/demodulator and control unit 306 and a processor 308, which is typically responsible for processing and compressing data. Read only memory (ROM) 309 contains instructions used by the processor in processing commands and compressing data along with other functions provided by modem 222.

Modulator/demodulator and control unit 306 provides modulator processes to convert digital signals from data processing system 100 to analog signals for transmission through modem line 302 to a remote data processing system using a PSTN. This unit also includes circuitry for demodulation to convert analog signals into digital signals for use by data processing system 100. Additionally, modulation/demodulation and control unit 306 also includes other circuitry used in processing data.

According to the present invention, a comparator 310 may be implemented within modulator/demodulator and control unit 306. Comparator 310 is employed to detect whether an electrical connection is present with modem line 302. Comparator 310 has an input connected to input 302 and is employed to detect whether an "electrical connection" is present based on voltage, current, and/or power received at input 302. If line 302 has one end connected to input 300 and another end connected to an external phone line, an electrical connection exists in the depicted example. It is possible for an electrical connection not to exist although line 302 is properly hooked up. For example, line 302 may be damaged or the external phone line has a break resulting in a loss of an electrical connection. The result of this is stored in register SX. Although the present invention is shown in a discreet modem 222, the present invention also may be implemented in multi-purpose digital signal processor cards, which provide a modem function. Additionally, the processes of the present invention may be incorporated into the motherboard of a data processing system that provides modem functions.

Figure 4:
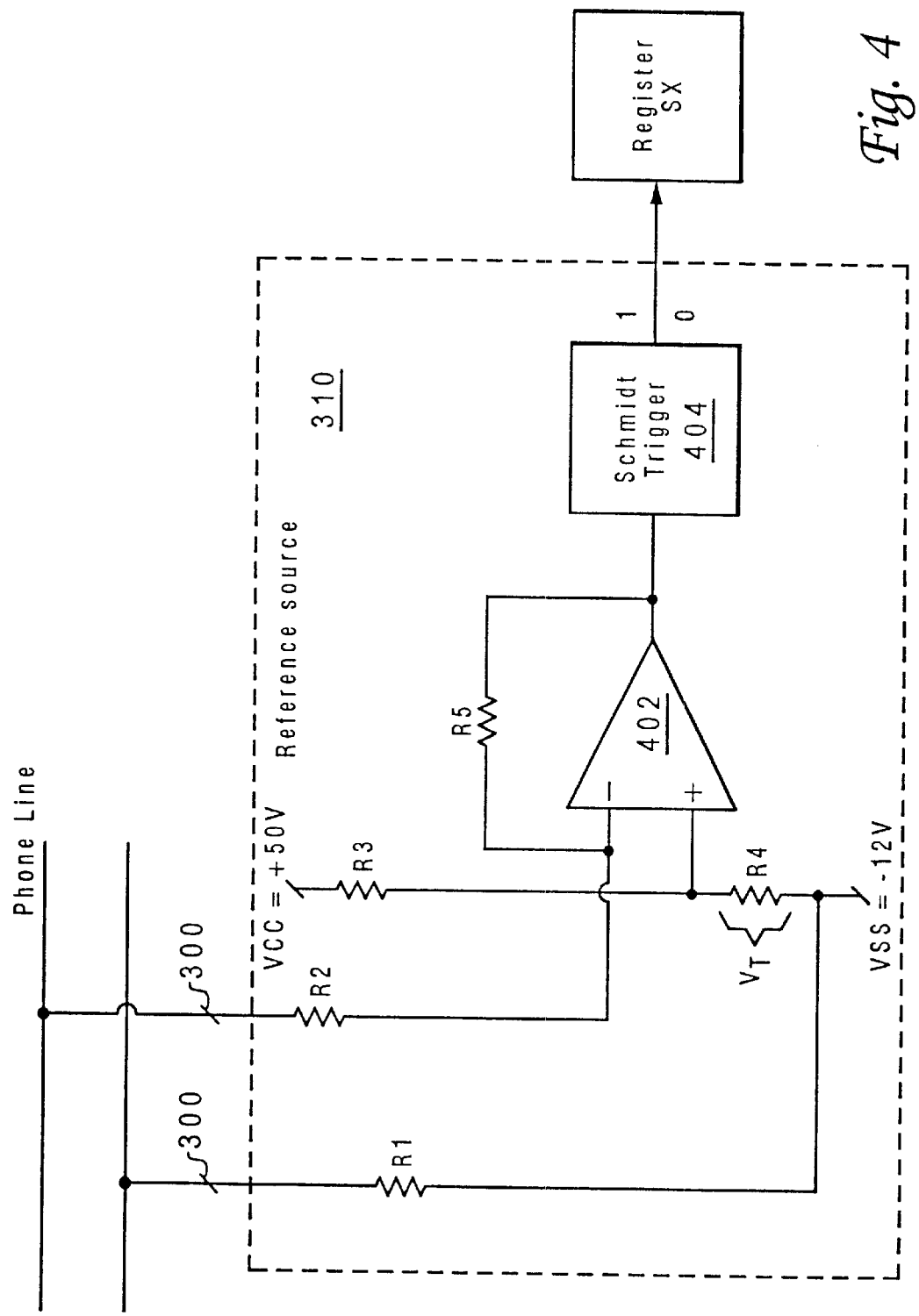
FIG. 4 is a block diagram of components used for detecting an electrical connection at a modem input according to the present invention.

With reference to FIG. 4, a block diagram of components used for detecting an electrical connection at modem input 300 is depicted according to the present invention. Comparator 310 includes an operational amplifier 402, a Schmidt trigger 404, and resistors R1–R5. Resistors R1 and R2 are employed to buffer the current from the phone lines when modem input 300 has a connection to live phone lines. Resistor R5 is part of the configuration and operational amplifier 402. Voltage $V_T$ is the voltage drop across resistor R4. This voltage drop is set by a combination of resistors R3 and R4 connected to an upper power supply VCC and a lower power supply voltage VSS. In the depicted example, the upper power supply voltage VCC is 50 volts, while the lower power supply voltage VSS is minus 12 volts. Additionally, $V_T$ is set equal to five volts based on the ratio of resistors R3 and R4. Resistor R3 also may be a variable resistor such that the threshold voltage may be altered. This threshold voltage is input into the plus input of operational amplifier 402, while the minus input of operational amplifier 402 is connected to modem input 300 which is adapted for connection to a phone line. The output of operational amplifier 402 is connected to Schmidt trigger 404, which generates a logic 1 if the voltage at the modem input 300 is less than the threshold voltage. Otherwise, a logic 0 is generated. The output of Schmidt trigger 404 is sent to register SX. The result could be stored in some other storage unit, such as a random access memory in modem 222. This data car be returned to the data processing system in response to a command or request for a test of the modem line. A threshold voltage is employed because, in some instances, a voltage may be present but not sufficient to provide an electrical connection that would facilitate communication of data to a remote data processing system. Such a lower voltage level could occur from damage to the line or in the connection to the PSTN. Although the depicted example illustrates the use of voltage to test for an electrical connection, other factors may be employed, such as, for example, current or power.

With reference now to FIG. 5, a flowchart of a process for testing a modem line in a data processing system is depicted according to the present invention. The process begins by sending a modem line test command to the modem (step 500). Thereafter, a reply is received from the modem (step 502). A determination is made as to whether an electrical connection is present (step 504). This may be done by returning a value of 1 to indicate that an electrical connection exists between the data processing system and the public switched telephone network. If the value is not set equal to 1, then an indication is made that the modem does not have an electrical connection (step 506). This indication is typically in the form of a message to the user of the data processing system and may be visual, audio, or a combination of the two.

Turning now to FIG. 6, a flowchart of a process for testing a modem line for an electrical connection is depicted according to the present invention. The process begins by the modem receiving a command to test the modem input (step 600). Next, the modem resets the register (step 602). The register is reset in case the modem line has become disconnected or damaged since the last test. Next, the modem input is tested (step 604). This test occurs using the components depicted in FIGS. 3 and 4. The test occurs with a threshold voltage being applied to the comparator to determine whether a voltage sufficient to indicate an electrical connection is present on the modem line. After the test, the result is stored in the register and returned to the data processing system (step 606). As described above, the data processing system uses the result to determine whether the user should be notified that an electrical connection is not present.

Figure 7A:
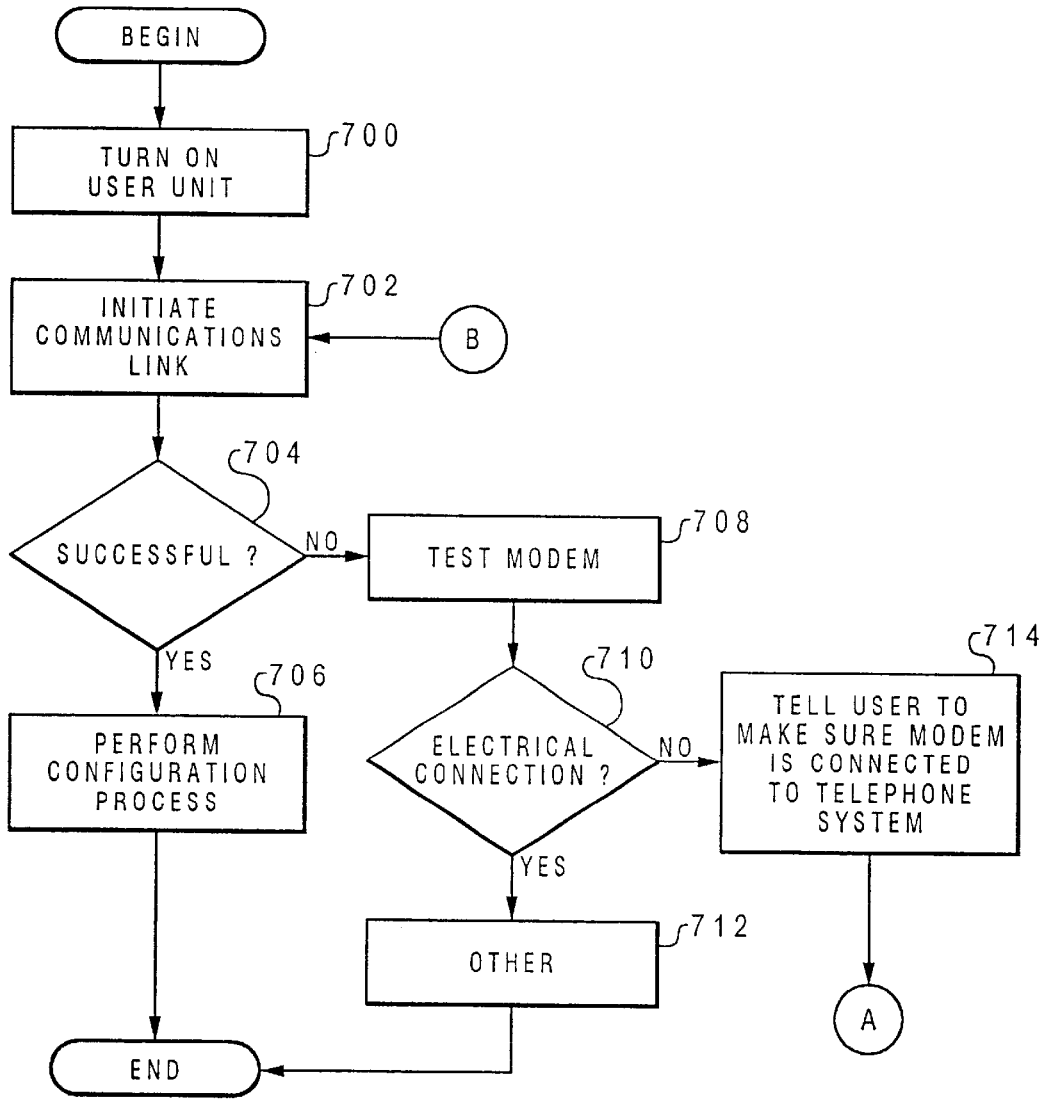
FIGS. 7A and 7B are flowcharts of a process for testing a modem for an electrical connection according to the present invention.
Figure 7B:
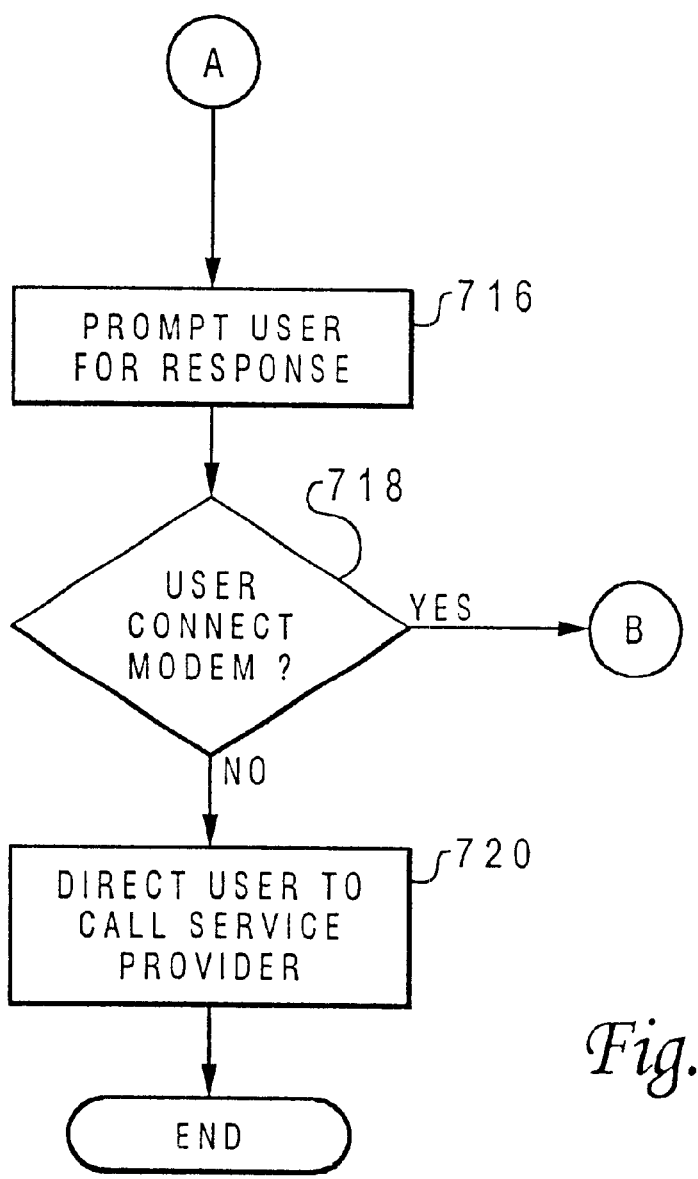

The test may be initiated by instructions located within the modem or by processor 204. Commands may be sent by processor 204 to modem 222 to perform this test. For example, well known "AT" commands may be employed. For example, "AT SX?" may be sent to the modem in which SX is the register number. Turning to FIGS. 7A and 7B, a flowchart of a process for testing a modem for an electrical connection during configuration of the device is depicted according to the present invention. The process begins by the user turning on the user unit (step 700). Thereafter, the user unit initiates a communications link (step 702). A determination is then made as to whether the attempt to initiate a communications link is successful (step 704). If the attempt to establish the communications link has been successful, the process then performs a configuration process to set up the user unit (step 706). Otherwise, the process tests the modem for an electrical connection (step 708). In the depicted example, a command is sent to the modem to initiate the step with the result being returned. A determination is then made as to whether an electrical connection is present (step 710). If an electrical connection is present, the process then performs other error handling processes (step 712). For example, the process may initiate a test to determine whether a dial tone is present. If an electrical connection is not present, the process then tells the user to make sure the modem is connected to the telephone system (step 714). The process then prompts the user for and receives a user response (step 716). Based on the response, determination is made as to whether the modem is connected to the telephone system (step 718). If the modem is connected to the telephone system, the process then directs the user to call the service provider (step 720). If the user connected the modem to the telephone system, the process then returns to step 702 as described above.

Additionally, existing modems equipped with a digital signal processor can be programmed to perform the steps necessary to determine whether an electrical connection is present. The digital signal processor may be programmed to detect whether an electrical connection is present based on the data being received by it.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include: recordable-type media such a floppy discs and CD-ROMs and transmission-type media such as digital and analog communications links.

Thus, the present invention provides a method and apparatus for testing whether a modem has been properly connected to a PSTN. In particular, by testing for an electrical connection rather than a dial tone, instances in which the use of another telephone connected to the same line causing a false indication that a connection is absent may be avoided. By testing for a voltage above a threshold voltage, a determination can be made that the line is acceptable for use in transferring data to a remote data processing system.

The description of the preferred embodiment of the present invention has been presented for purposes of illustration and description, but is not limited to be exhaustive or limited to the invention in the form disclosed. Many modifications and variations will be apparent to those of ordinary skill in the art. That the embodiment was chosen and described in order to best explain the principles of the invention the practical application to enable others of ordinary skill in the art to understand the invention for various embodiments with various modifications as are suited to the particular use contemplated.

What is claimed is:

1. A method for testing a modem for connection to a telephone network line, comprising:

comparing a voltage on a modem input adapted for connection to the telephone network line to a threshold voltage equal to or lower than a dial tone voltage by:
connecting a first modem input conductor of the modem input to a first input of an operational amplifier;
connecting a first resistor between an upper power supply voltage and a second input of the operational amplifier;
connecting a second resistor between a lower power supply voltage and the second input of the operational amplifier, wherein the first and second resistors are sized to create a voltage drop across the second resistor equal to the threshold voltage;
connecting a second modem input conductor of the modem input to an end of the second resistor connected to the lower power supply voltage;
connecting an output of the operational amplifier to a Schmidt trigger; and
employing an output of the Schmidt trigger as a result of comparing the voltage on the modem input to the threshold voltage; and
determining whether the modem has an electrical connection to the telephone network line based on the voltage on the modem input.

2. The method of claim 1, wherein the determining step comprises determining whether the voltage on the modem input is equal to or greater than the threshold voltage.

3. The method of claim 1, wherein the determining step comprises determining whether the modem input has a current greater than a threshold current.

4. The method of claim 1, wherein the determining step comprises determining whether the modem input has a power level greater than a threshold power level.

5. The method of claim 1, further comprising:

generating a logic 1 in response to the voltage on the modem input being equal to or greater than the threshold voltage.

6. The method of claim 1, wherein the threshold voltage is greater than or equal to a voltage required for communication with a remote data processing system over the telephone network line.

7. The method of claim 1, further comprising:

connecting the output of the Schmidt trigger to a register;

connecting buffer resistors to the first and second modem input conductors; and connecting a negative feedback loop to the operational amplifier.

8. A data processing system for testing a modem for connection to a telephone network line, comprising:

comparison means for comparing a voltage on a modem input adapted for connection to the telephone network line to a threshold voltage equal to or lower than a dial tone voltage; and determination means for determining whether the modem has an electrical connection to the telephone network line based on the voltage on the modem input, wherein the determination means includes:

an operational amplifier having a first input connected to a first modem input conductor of the modem input:

a first resistor connected between an upper power supply voltage and a second input of the operational amplifier;

a second resistor connected between a lower power supply voltage and the second input of the operational amplifier, wherein the first and second resistors are sized to create a voltage drop across the second resistor equal to the threshold voltage and a second modem input conductor of the modem input is connected to an end of the second resistor connected to the lower power supply voltage; and a Schmidt trigger connected to an output of the operational amplifier, wherein the output of the Schmidt trigger produces a result of the comparison of the voltage on the modem input to the threshold voltage.

9. The data processing system of claim 8, wherein the determination means comprises means for determining whether the voltage on the modem input is equal to or greater than the threshold voltage.

10. The data processing system of claim 8, wherein the determination means comprises means for determining whether the modem input has a current greater than a threshold current.

11. The data processing system of claim 8, wherein the determination means comprises means for determining whether the modem input has a power level greater than a threshold power level.

12. The data processing system of claim 8, wherein the modem includes a comparator having a first input connected to the modem input and a second input at the threshold voltage, and an output, wherein the comparator generates a logic 1 at the output in response to a voltage at the modem input being equal to or greater than the threshold voltage.

13. The data processing system of claim 8, wherein the determination means includes a comparator having a first input connected to the modem input, a second input at the threshold voltage, and an output, wherein the comparator indicates whether an electrical connection is present between the modem and the telephone line at the output.

14. The data processing system of claim 8, wherein the threshold voltage is greater than or equal to a voltage required for communication with a remote data processing system over the telephone network line.

15. The data processing system of claim 8, further comprising:

a register connected to the output of the Schmidt trigger;

buffer resistors connected to the first and second modem input conductors; and a negative feedback loop connected to the operational amplifier.

* * * * *